United States Patent [19]

Goto et al.

[11] 4,291,791

[45] Sep. 29, 1981

[54] FREE WHEEL HUB MECHANISM

[75] Inventors: Hiromi Goto, Chiryu; Kenji Ojima, Toyota, both of Japan

[73] Assignee: Aisin Seiki Kabushiki Kaisha, Kariya, Japan

[21] Appl. No.: 90,142

[22] Filed: Nov. 1, 1979

[30] Foreign Application Priority Data

Nov. 13, 1978 [JP] Japan .................................. 53-139960

[51] Int. Cl.³ .............................................. F16D 11/00
[52] U.S. Cl. .............................. 192/67 R; 192/93 A; 192/110 B; 403/1
[58] Field of Search ............... 192/67 R, 93 A, 110 B; 403/1

[56] References Cited

U.S. PATENT DOCUMENTS

| | | | |
|---|---|---|---|
| 2,436,717 | 2/1948 | Foster | 192/93 A |
| 2,788,103 | 4/1957 | Requa | 192/93 A X |
| 3,442,361 | 5/1969 | Hegar | 192/93 A X |
| 3,753,479 | 8/1973 | Williams | 403/1 |
| 4,007,820 | 2/1977 | Kagata | 192/67 R |
| 4,185,727 | 1/1980 | Yamaguchi et al. | 403/1 |

*Primary Examiner*—Allan D. Herrmann
*Attorney, Agent, or Firm*—Oblon, Fisher, Spivak, McClelland & Maier

[57] ABSTRACT

A free wheel hub mechanism including a body fixed to a wheel, an annular clutch continuously engaged with the body, an interengaging member connected to an axle shaft rotatable therewith and engageable with the annular clutch, a follower operatively connected to the annular clutch and axially movable in response to the rotation of a manual handle, and a nut fixed to the axle shaft for supplying a preload force on a taper bearing between a housing and the axle shaft.

1 Claim, 1 Drawing Figure

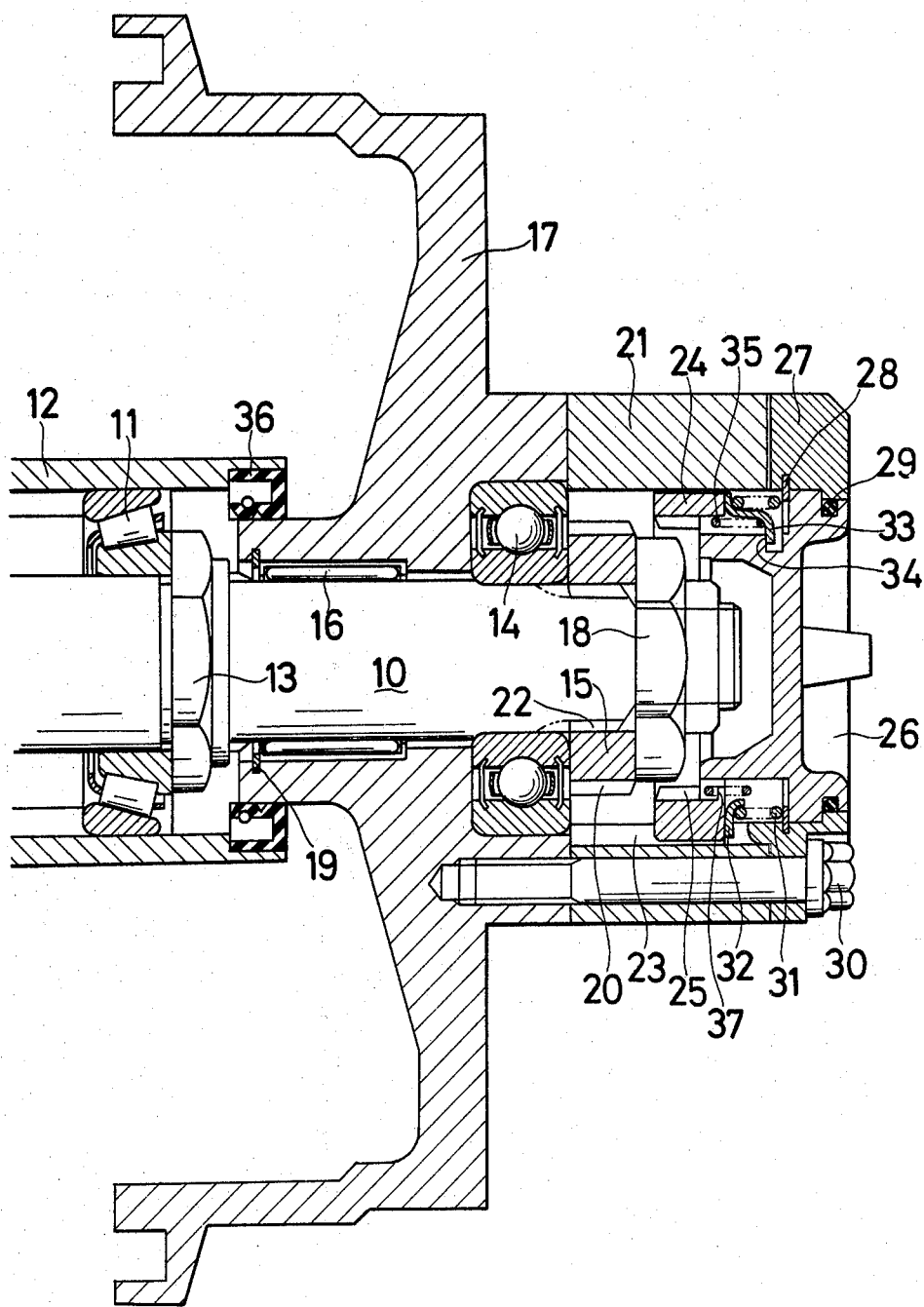

FREE WHEEL HUB MECHANISM

BACKGROUND OF THE INVENTION

1. Field of the Invention

This invention relates to a free wheel hub mechanism and, more particularly, to a free wheel hub mechanism for transmitting a driving force or torque from an axle shaft to wheels of the vehicle upon the application of driving force to the axle shaft.

2. Description of the Prior Art

In a conventional free wheel hub mechanism, a preload force is directly acted on a taper bearing interposed between an axle shaft and a housing by an interengaging member and it is required that such not rattle between the interengaging member and a brake drum through a thrust bearing. This means that the tightening force for the taper bearing or the thrust bearing is often scattered or dispersed with the result that the lifetime of the axle shaft is shortened and the brake drum lacks stability.

SUMMARY OF THE INVENTION

Therefore, it is an object of the present invention to provide an improved free wheel hub mechanism which obviates the above-noted drawbacks.

It is another object of the present invention to provide an improved free wheel hub mechanism which is simple to assemble.

BRIEF DESCRIPTION OF THE DRAWINGS

Various other objects, features and attendant advantages of the present invention will be more fully appreciated as the same becomes better understood from the following detailed description of the present invention when considered in connection with the accompanying drawing, wherein:

The sole FIGURE is a cross-sectional view of a free wheel hub mechanism illustrating the preferred embodiment of the present invention.

DETAILED DESCRIPTION OF THE PREFERRED EMBODIMENT

Referring now to the sole FIGURE, reference numeral 10 denotes a front axle shaft for a front wheel drive vehicle. The axle shaft 10 is rotatably supported within a tubular housing 12 by a taper bearing 11. A nut 13 is fixed to the axle shaft 10. The taper bearing 11 is pre-loaded by the nut 13 so as to provide a sufficient tightening force to the taper bearing 11. An interengaging member 15 is operatively connected to the axle shaft 10 through a spline connection. A brake drum 17 is rotatably mounted on the outer circumference of the axle shaft 10 through a needle bearing 16 and a bearing 14. The radial load on the axle shaft 10 is supported by bearings 14 and 16.

A nut 18 is screwed onto the right end of the axle shaft 10 so as to prevent removal or slippage of the bearing 14 and the interengaging member 15 from the axle shaft 10. Reference numeral 19 denotes a stopper ring for the needle bearing 16.

The interengaging member 15 has at least one spline 20 formed on an outer circumference thereof. A body member 21 is provided on the right end of the brake drum 17. A front wheel (not shown) is fixed on the brake drum 17 by means of bolts (not shown). Brake drum 17 and body member 21 are integrally connected by a front wheel (not shown) and are rotatably mounted on the axle shaft 10 through the needle bearing 16 and bearing 14. The interengaging member 15 is integrally rotated with the axle shaft 10 through the at least one spline 22 on the outer circumference of the axle shaft 10.

At least one spline is provided on an outer circumference of an annular clutch 24 and is engageable with at least one spline 23 provided on an inner circumference of the body member 21 upon sliding movement of annular clutch 24. At least one spline 25 is provided on the inner circumference of annular clutch 24 and is engageable with the at least one spline 20 of the interengaging member 15.

When the annular clutch 24 is moved leftwardly in the sole FIGURE, spline 25 of the annular clutch 24 and spline 20 of the interengaging member 15 are engaged to thereby achieve an actuating connection for transmitting torque of the axle shaft 10 to the wheel (not shown). The torque of the axle shaft 10 is transmitted to interengaging member 15, clutch 24, body member 21, brake drum 17 and the wheel (not shown). In brief, when the annular clutch 24 is in the disengaging state, as shown in the sole FIGURE, the wheel (not shown) is cut off from the axle shaft 10 and is freely rotated, and when the annular clutch 24 is moved leftwardly into the engaging state with interengaging member 15 from the position shown in the sole FIGURE, the wheel (not shown) and the axle shaft 10 are connected so as to transmit torque of the axle shaft 10.

A cam mechanism for engaging or disengaging the annular clutch 24 by moving the annular clutch 24 leftwardly or rightwardly in the sole FIGURE is described hereinbelow.

A manual handle or lever 26 is rotatably supported by an inner circumference of a ring-shaped cover 27. Reference numeral 28 denotes a stopper ring for the handle 26 and a seal 29 is provided on an outer circumference of the handle 26. Cover 27 is fixed to the body member 21 by means of at least one bolt 30. A compression spring 31 interposed between the stopper ring 28 and a cam follower 32 urges the cam follower 32 leftwardly in order to maintain the annular clutch 24 in the engaging state. The cam follower 32 is generally annular shaped and is provided with a projecting portion 33 at one end thereof. The projecting portion 33 of the cam follower 32 is engaged with a cam face 34 of the manual handle 26 which acts on the projecting portion 33 of the cam follower 32 so as to move the projecting portion 33 of the cam follower 32 rightwardly in the sole FIGURE. Movement of the projecting portion 33 of the cam follower 32 rightwardly toward the stopper ring 28 compresses the spring 31. Upon rotation of the manual handle 26, the cam follower 32 is moved leftwardly or rightwardly by the cam operation which is caused by the cam face 34 of the manual handle 26 and the projecting portion 33 of the cam follower 32.

In accordance with the leftward or rightward movement of the cam follower 32, the annular clutch 24 is also moved leftwardly or rightwardly through springs 31 and 35. The right end of spring 35 is engaged with a pair of opposed hooks or similar structure (not shown in the drawing) on the cam follower 32. Accordingly, spring 35 is disposed between the hooks and an inner groove 37 of the annular clutch 24. The annular clutch 24 is drawn into the cam follower 32 by the contractile force of the spring 35 which is interposed between the projecting portion 33 of the cam follower 32 and an inner groove 37 of the annular clutch 24. The annular clutch 24 is moved leftwardly via the spring 31 by rotating the manual handle 26 which causes the spline 25 of the annular clutch 24 to interfere with the spline 20 of the interengaging member 15 due to the initial misalignment between the splines 20 and 25. Thereafter the splines 20 and 25 become aligned consistent or cooperative with each other upon slow driving rotation of the axle shaft 10. At this time the spring 31 acts so as to engage the spline 25 of the annular clutch 24 and the spline 20 of the interengaging member 15. Even if the annular clutch 24 is forcefully loaded due to sudden driving operation of the axle shaft 10, the annular clutch 24 is not violently contacted with the cam follower 32 and, cam follower 32 and manual handle 26 are not damaged. Reference numeral 36 denotes a sealing member.

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A free wheel hub mechanism for a wheel comprising:
   a housing member;
   an axle shaft disposed within said housing member;
   a body member secured to said wheel;
   an interengaging member connected to said axle shaft so as to be rotatable therewith;
   clutch means slidably mounted within said body member for engaging with and disengaging from said interengaging member;
   a manual lever connected to said body member having a cam face formed thereon;
   a cam follower engaged with said cam face of said manual lever at a first end thereof and engaged with said clutch means at a second end thereof;
   means interposed between said cam follower and said clutch means for urging said clutch means so as to disengage from the intergaging member;
   a taper bearing interposed between said axle shaft and said housing member;
   a nut fixed to said axle shaft for pre-loading said taper bearing whereby a tightening force is applied to said taper bearing by said nut;
   a brake drum connected to said body member;
   thrust bearing means interposed between said brake drum and said axle shaft for rotatably supporting said brake drum; and
   a second nut fixed to said axle shaft for maintaining said thrust bearing means and said interengaging member on said axle shaft.

* * * * *